United States Patent [19]
Nishino et al.

[11] Patent Number: 5,857,024
[45] Date of Patent: Jan. 5, 1999

[54] IC CARD AND AUTHENTICATION METHOD FOR INFORMATION PROCESSING APPARATUS

[75] Inventors: Kiyoshi Nishino, Yamato; Takashi Oshiyama, Fujisawa, both of Japan

[73] Assignee: International Business Machines Corporation, Armonk, N.Y.

[21] Appl. No.: 726,304

[22] Filed: Oct. 2, 1996

[30] Foreign Application Priority Data

Oct. 2, 1995 [JP] Japan ................................ 7-255262

[51] Int. Cl.⁶ .................................. H04L 9/32; H04L 9/00
[52] U.S. Cl. .................................. 380/25; 380/4; 380/9; 380/23; 380/49; 380/50; 235/380
[58] Field of Search .............................. 380/4, 9, 23, 24, 380/25, 49, 50, 59; 235/379, 380

[56] References Cited

U.S. PATENT DOCUMENTS 4,450,535  5/1984  De Pommery et al. ............. 380/24 X
4,910,774  3/1990  Barakat ................................... 380/23

*Primary Examiner*—Bernarr E. Gregory
*Attorney, Agent, or Firm*—Ronald L. Drumheller

[57] ABSTRACT

An IC card 30, which is employed to permit the exchange of secret information while ensuring that security is maintained, includes: a ROM 38 in which an ID is held; a clock 42; a RAM 40 in which a password is stored; a RAM 36 in which a ciphering program is stored; and a CPU 34 that executes a process. The ciphering program is loaded, the stored ID, password and the time t measured by the clock 42 are read and encoded in accordance with the ciphering program, and the results are outputted to a computer system 10. The computer system 10 decodes the output from the IC card 30 and extracts a password, and compares the decoded password with a registered password. When the passwords match, access is enabled; but when they do not match, access is disabled.

6 Claims, 7 Drawing Sheets

INFORMATION PROCESSING APPARATUS

FIG.6B

INFORMATION PROCESSING APPARATUS

IC CARD AND AUTHENTICATION METHOD FOR INFORMATION PROCESSING APPARATUS

BACKGROUND OF THE INVENTION

1. Field of the Invention

The present invention relates to an IC card, and an authentication method for an information processing apparatus; and in particular to an IC card that can be connected to an information processing apparatus, such as a computer or a terminal, and an authentication method for an information processing apparatus, by which the above IC card is employed to authenticate a mutual connection between the IC card and the information processing apparatus.

2. Related Art

A terminal device connected to a network, a stand-alone microcomputer that can independently execute applications, a portable microcomputer, etc. (hereinafter referred to as an information processing apparatus), together are known as an apparatus that processes data produced by users. Such an information processing apparatus is so designed that it can be employed by a plurality of users. Although a specific process can be performed by an information processing apparatus, information (hereinafter referred to as secret information), such as personal telephone numbers or identification numbers, that is highly confidential and should not be revealed to other persons may be stored in the information processing apparatus. Thus, security for such a system is required so that secret information can not be obtained by users other than those to whom it is registered.

Figure 6A:
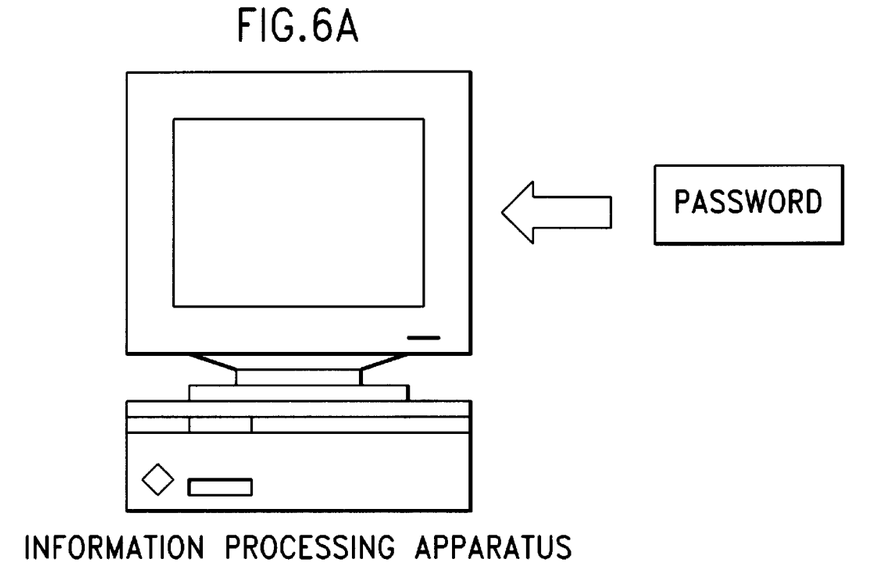
FIGS. 6A and 6B are diagrams of conventional security systems.

With one conventional example, which is shown in FIG. 6A, security is maintained by permitting an information processing apparatus to perform a process only when a match is obtained between a password input and a password previously registered. For example, when network access is sought by a terminal device on a network, the network issues a request to the terminal device for the input of a password, and grants access permission only when the password input matches one that was previously registered. A cash dispenser (automatic teller machine) is another well known information processing example. To make a withdrawal from a cash dispenser, a cash card must be inserted into the cash dispenser, and an identification number, which corresponds to a password and which was previously registered, must then be input.

If third persons can obtain passwords, however, it is possible for anybody to execute a process on an information processing apparatus. To prevent that, passwords may be updated periodically. When, however, the concern for security results in the setting of a too short time period for the updating of passwords, the burden placed on users is large. But if the update period is extended in order to reduce the load on the users, the chance that security will be endangered is increased.

Figure 6B:
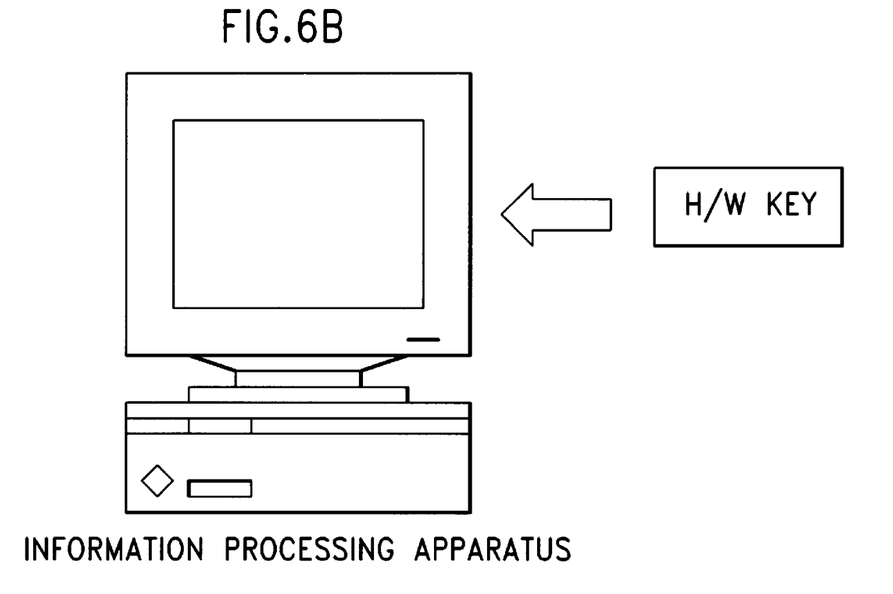

To resolve this problem, as is shown in FIG. 6B, a physical device (a hard wire key: H/W key) may be required to be added to the information processing apparatus before a process can be executed by the information processing apparatus. As a result, the execution of the process by the information processing apparatus is permitted only when the physical device is provided.

With a process that is well known as reverse engineering, however, it is relatively easy to produce an identical copy of such a physical device. For example, for a physical device that incorporates a ROM, and performs an authentication procedure in accordance with data entered in the ROM, a like device can be produced simply by copying the data from the ROM. For a physical device constituted by a logical circuit, etc., a comparable device can be produced by detecting an output signal. In this manner, if the same physical device can be produced, anyone can execute a process for an information processing apparatus.

As the latest development by the information industry, well known is an IC card, such as a memory card and an LSI card on which fixed data can be held, that has a miniaturized processor, which is an independent external device connected by a cable, that is connected to a terminal to function as an external connection device.

A terminal confirmation method is a method by which the IC card is employed to confirm hardware, or a component of a communication system, for the purpose of ensuring the security and the protection of communication (see Japanese Examined Patent Publication No. Hei 4-51864). With this method, a secret number, such as a password stored on a memory card, is employed as a key and is used for the encoding at a first terminal of random numbers that are output to a second terminal. The second terminal decodes the encoded numbers (random numbers) by using a key stored in advance. When the keys at the two terminals are identical, the random numbers are generated, and the inductive form of the random numbers is employed to encode the key. Thus, a response is generated and is output to the first terminal. Then, the first terminal employs the random numbers as a key to determine whether or not the response was produced by encoding the key. When the response yields the encoded key, the second terminal is confirmed. When the response does not yield the encoded key, the terminal is not confirmed and communication is halted.

However, for the conventional terminal confirmation method, the keys on a card and at a terminal are fixed, and if a key, which corresponds to a password, is known to third persons, everybody can execute a process performed by an information processing apparatus. As is described above, therefore, in the interests of security keys must be updated within short intervals, and the burden placed on users is increased.

SUMMARY OF THE INVENTION

To overcome this shortcoming, it is one object of the present invention to provide an IC card with which highly confidential information can be exchanged while ensuring the maintenance of security, and an authentication method for an information processing apparatus.

To achieve the above object, according to the present invention, an IC card, which can be connected to an information processing apparatus, comprises: a clock for counting time; ID storage means for storing an ID that represents inherent information determined in advance; secret information storage means for storing secret information to identify the IC card when the IC card is connected to the information processing apparatus; procedure storage means for at least storing an encoding procedure for encoding the secret information; and control means for at least encoding the secret information in accordance with the encoding procedure stored in the procedure storage means. The secret information that is used to identify the IC card is an ID number and a password. The encoding procedure is a ciphering program and an encoding program.

A plurality of procedure storage means may be provided wherein a plurality of encoding procedures for encoding the secret information are stored. In this case, the control means selects one of the encoding procedures stored in the individual procedure storage means, and encodes at least the secret information according to the selected encoding procedure.

An authentication method for an information processing apparatus according to the present invention employs the above described IC card, and authenticates a mutual connection between the IC card and the information processing apparatus, in which the secret information is registered in advance.

The information processing apparatus outputs to the IC card the secret information registered in advance, and the encoding procedure. The secret information and the encoding procedure are then read and stored on the IC card. At this time, with respect to the information processing apparatus, the IC card serves as a key for authentication of a mutual connection. The stored secret information, ID information, and a time count performed by a clock are read from the IC card. The reading time, the secret information, and the ID information are inherent information to the IC card. The reading time, the secret information, and the ID information are encoded in accordance with the stored encoding procedure, and the resultant information is output to the information processing apparatus. Therefore, the information input to the information processing apparatus is special information obtained by encoding current information that is inherent to the IC card.

Upon the receipt of the information from the IC card, the information processing apparatus decodes it in accordance with a decoding procedure that corresponds to the encoding procedure. Since the IC card is regarded as authentic if the decoded secret information is a response output from the information processing apparatus, when the decoded secret information matches the secret information registered in advance, the mutual connection is confirmed.

The secret information and the encoding procedure can be altered in accordance with instructions from the IC card side issued at periodical intervals based on the time count performed by the clock.

In this context, the IC card may have a clock, and can itself perform a time count for a period within which the secret information and the encoding procedure should be altered. Thus, to ensure security, the secret information and the encoding procedure can be altered at periodical intervals, determined in advance, without a long time elapsing.

DESCRIPTION OF THE PREFERRED EMBODIMENTS

One embodiment of the present invention will now be described in detail while referring to the drawings. The present invention is applied for a case wherein a computer system, which serves as an information processing apparatus, exchanges data with an IC card that is requesting permission (for process execution) to access the computer system.

Figure 1:
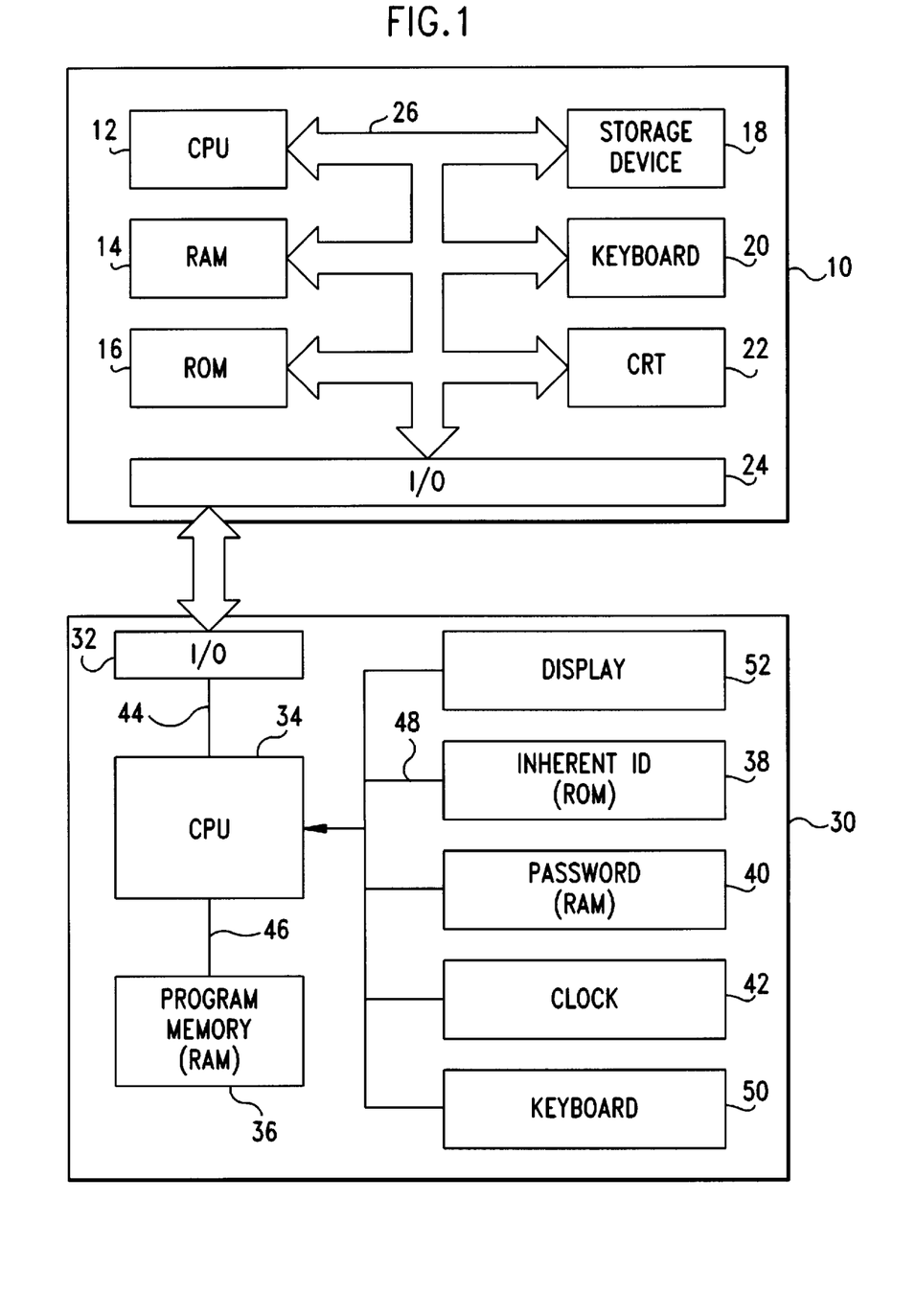
FIG. 1 is a schematic block diagram illustrating a computer system and an IC card according to one embodiment of the present invention.

As is shown in FIG. 1, the arrangement that employs an authentication method for an information processing apparatus according to the embodiment comprises a computer system 10 and an IC card 30. The computer system 10 is constituted by a CPU 12, a RAM 14, a ROM 16, a storage device 18, a keyboard 20, a CRT 22, an input/output (I/O) device 24, and a bus 26 that connects these components so that they can exchange commands and data with each other. The storage device 18 stores a ciphering program for performing a predetermined encoding process, which will be described later. A registered password is also stored therein.

The IC card 30 has an input/output unit (I/O) 32, which is connected to the input/output device 24 of the computer system 10. The input/output unit 32 of the IC card 30 is connected via a bus 44 to a CPU 34, which is an operation unit. The CPU 34 is connected via a bus 46 with a nonvolatile RAM 36, which will be described later, that is a program memory wherein an encoding program is temporarily stored. The CPU 34 is also connected via a bus 48 with a ROM 38 stored inherent data that are recorded when the IC card 30 is manufactured, a nonvolatile RAM 40 wherein a password is stored, and a clock 42 that serves as an incorporated clock. Inherent data to the IC card 30, e.g., a serial number and an ID, such as a label, that represents the type of the IC card, are written in the ROM 38 during the manufacturing process.

The IC card 30 in this embodiment comprises the input/output (I/O) unit 32, the CPU 34, the RAM 36, the ROM 38, the RAM 40, and the clock 42, which are the essential components, and further comprises a keyboard 50, which is input means for entering a password, and a display 52, which is display means for displaying data and commands. The keyboard 50 and the display 52 are connected to the bus 48. Since the IC card 30 has the keyboard 50, the input of a password, commands, and data can be performed by using the IC card 30. And as the IC card 30 has the display 52, a password, commands, and data on the IC card can be confirmed. The keyboard 50 and the display 52 are not necessarily required for the IC card 30, and only the keyboard 50 or the display 52 may be provided. Further, a keyboard 20 for the system 10 may be used for inputting a password, etc., and a CRT 22 may be used for displaying the input data for confirmation.

Figure 7:
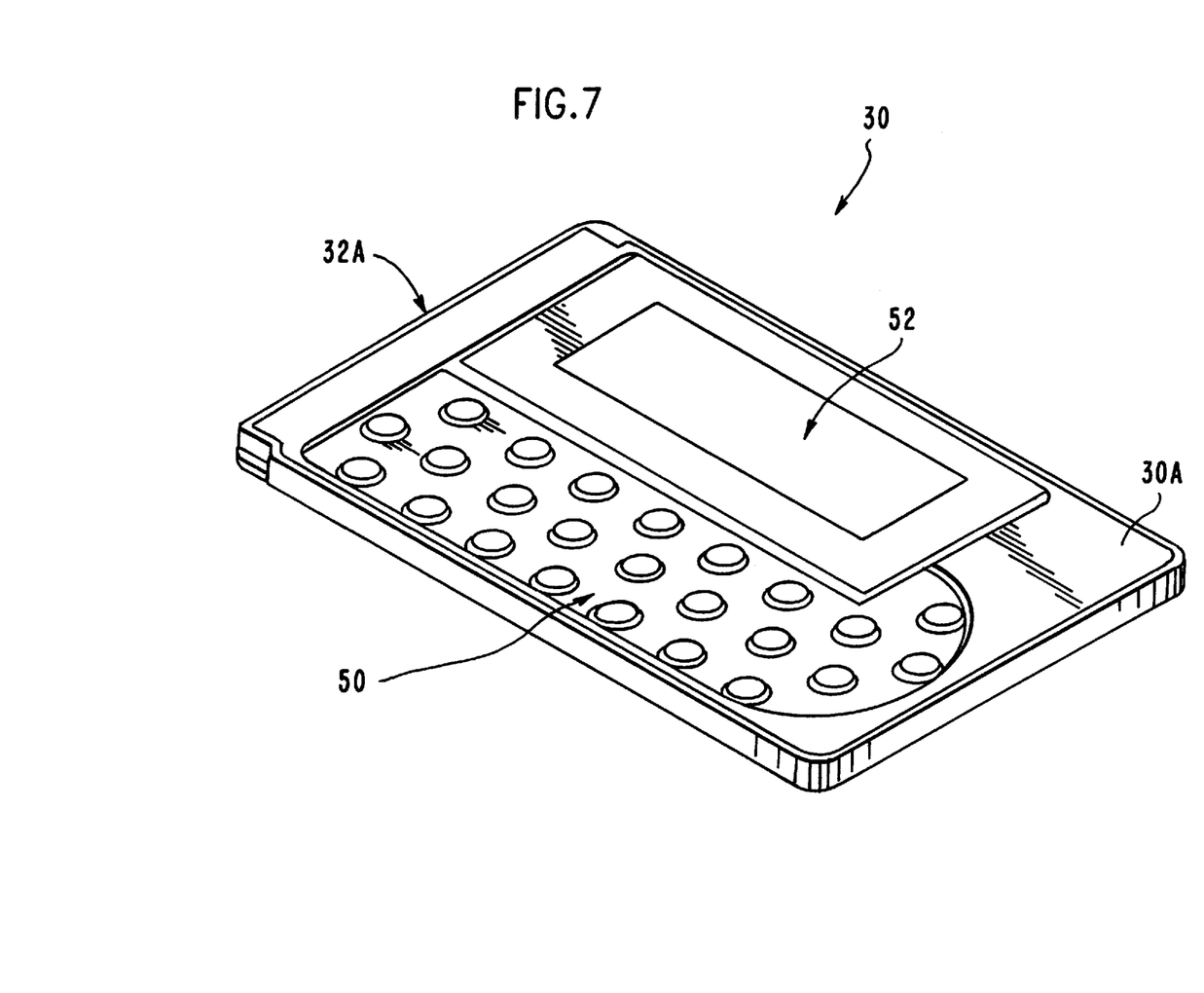
FIG. 7 is a perspective view of the external appearance of the IC card.

FIG. 7 is a perspective view of the example external appearance of the IC card 30. The IC card 30 in FIG. 7 is a detachable credit card size (a so-called PCMCIA card: an expansion card that conforms to the PCMCIA standards). The input/output unit 32, the CPU 34, the RAM 36, the ROM 38 the RAM 40, and the clock 42 are incorporated in a casing 30A. On the top surface of the casing 30A are provided the keyboard 50, which consists of a plurality of button switches that correspond to the alphabet letters and numbers, and the display 52, which is formed from an LCD unit. A terminal 32A is provided on the side of the casing 30A, and serves as a connection terminal to connect the input/output unit 32 to an external device. The IC card 30 can also be inserted into a card slot (not shown) provided on the computer system 10, and the terminal 32A is connected to a terminal (not shown) in the card slot.

The authentication procedure performed between the computer system and the IC card will now be described while referring to FIGS. 2 and 3.

Figure 2:
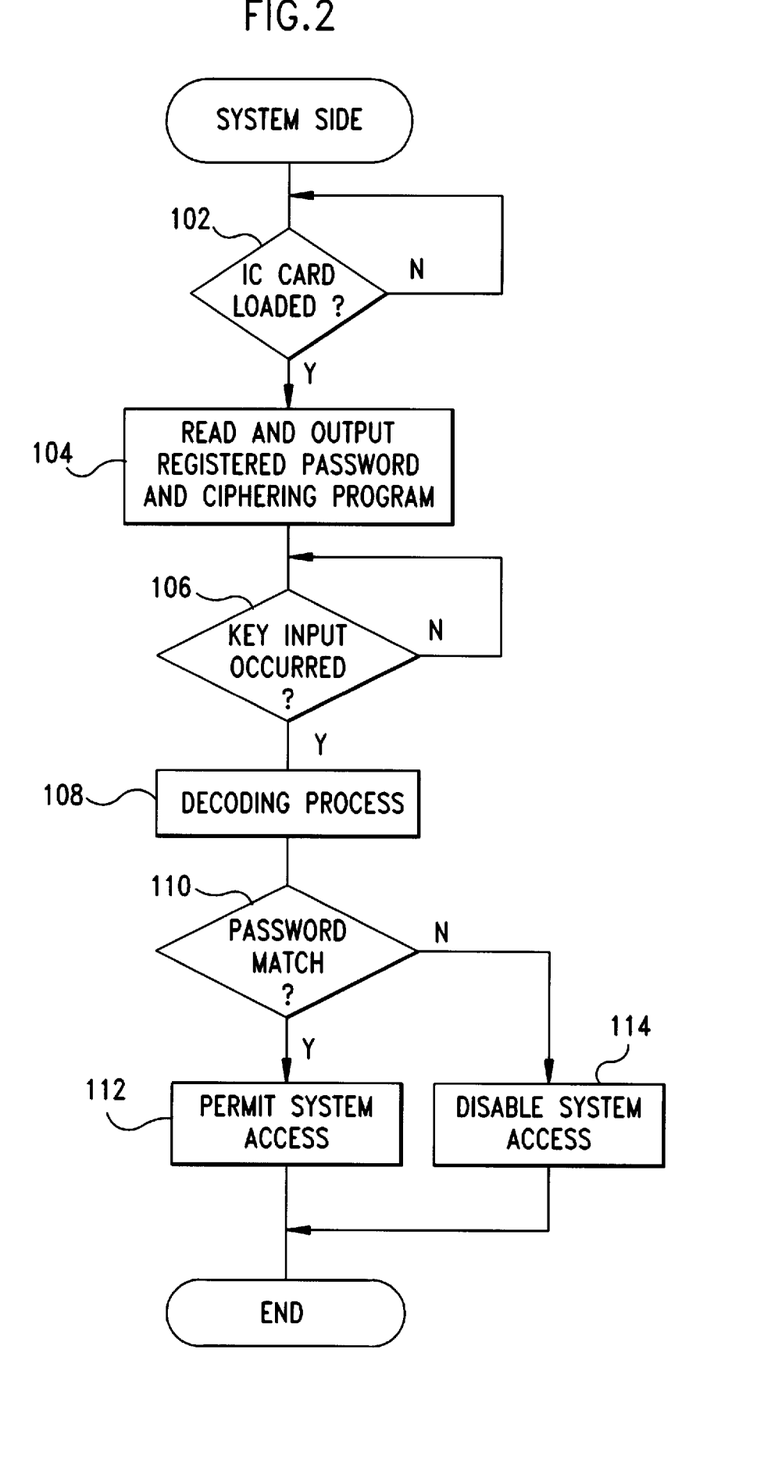
FIG. 2 is a flowchart for a process performed by the computer system.
Figure 3:
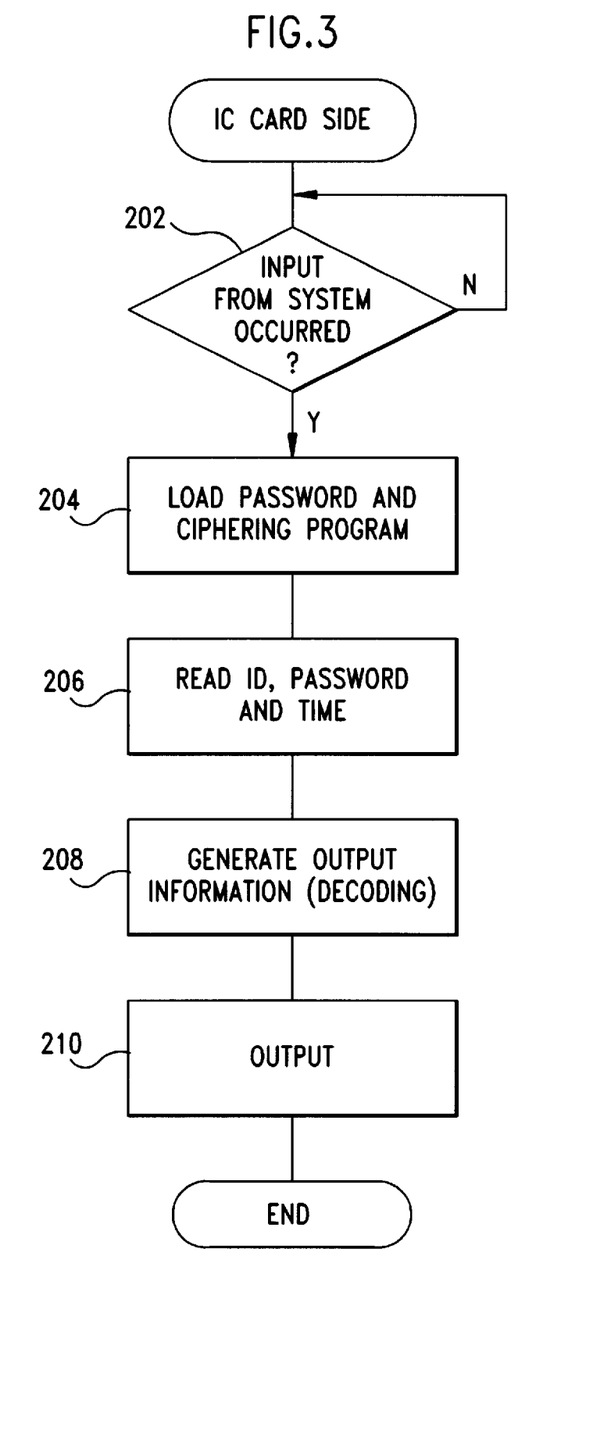
FIG. 3 is a flowchart for a process performed by the IC card.

As is shown in FIG. 2, at step 102, the computer system 10 determines whether or not the input/output unit 32 of the IC card 30 is connected to the input/output device 24 to ascertain whether or not the IC card 30 is inserted into the computer system 10. When the result at step 102 is affirmative, i.e., the IC card 30 is inserted, program control advances to step 104, whereat a password, which has been registered and stored in the storage device 18, and a ciphering program are read and output to the IC card 30.

The IC card 30 repeats the procedure at step 202 until a signal from the computer system 10 is input. When a signal from the computer system 10 (at step 104 in FIG. 2) is input, the result at step 202 is affirmative, and program control advances to step 204. At step 204, a password output by the computer system 10 and a ciphering program are received. The password is stored in the RAM 40, while the ciphering program is stored in the RAM 36. Then, the stored ciphering program is read so that it can be executed (i.e., the ciphering program is loaded).

When the above process has been completed, the IC card 30 serves as a security key. More specifically, at this stage the IC card 30 can output a password in accordance with the password and the ciphering program, which will be described later, and thus serves as a system that is equivalent to a computer system that mounts a hard wired device.

Since the IC card 30 in this embodiment has the keyboard 50, a password can be also input at the keyboard 50. In this case, at step 104 in FIG. 2, only the ciphering program is output. At step 204 in FIG. 3, the ciphering program output by the computer system 10 is received and is stored in the RAM 36. Although not shown, a password input process is added before or after the procedure at step 204 in FIG. 3. The password input at the keyboard 50 of the IC card 30 is stored in the RAM 40. The password in this case may be displayed on the display 52. To ensure that security is adequate, masking may be performed whereby symbols are displayed only to indicate that there has been input.

At step 206, the ID stored in the ROM 38, the password stored in the RAM 40, and the time t measured by the clock 42 are read. At step 208, as is explained below, the ID, the password and the time t are encoded in accordance with the ciphering program to generate information. At step 210, the generated information is output to the computer system 10. It should be noted that the generated information may also be output to the computer system 10 upon the request of the computer system 10.

An example encoding process performed at step 208 will now be described. In this embodiment, password P from the computer system 10, an ID which is inherent information to the IC card 30, and time t which is measured by the clock are employed to encode a password. The password P, the ID and the time t are encoded according to the following expression (1) to obtain output information G.

$$G = RND\{F(P, ID, t)\} \tag{1}$$

F: a function that is a combination of addition, subtraction, multiplication and division, and RND: a random function (used in a general programming language).

In this manner, the IC card 30 obtains random numbers by encoding the password and transmits them as output information to the computer system 10.

It is preferable that the time required by the computer system 10 substantially match the time measured by the clock in order for the identity process to be performed more efficiently.

The computer system 10 repeats the procedure at step 106 in FIG. 2 until a signal (output information) is transmitted by the IC card 30. When the IC card 30 outputs the information, the result at step 106 in FIG. 2 becomes affirmative and program control advances to step 108. At step 108, the information output by the IC card 30 is read and a decoding process is performed. Through this process, a password included in the output information can be extracted. More specifically, the information received from the IC card 30 is the information (random numbers) obtained by means of the ciphering program (the process in which expression (1) is used in this embodiment), which was output to the IC card 30 at step 104. The decoding process is thus easy to perform, and for example, can be performed by using an inverted function of expression (1). The computer system 10 may store in advance a decoding program for decoding information generated by a ciphering program.

At step 110, a check is performed to determine whether or not the password obtained through the decoding process matches the registered password. When the passwords match, and thus the result at step 110 is affirmative, at step 112 access to the computer system 10 is permitted. That is, the process using the computer system 10 can be performed. For example, when the computer system 10 is connected to a network and the IC card 30 is used to access the network, the above condition corresponds to the obtaining of an access right at the log-on time.

When the passwords do not match, and the result at step 110 is therefore negative, at step 114 access to the computer system 10 is disabled, and program control is forcibly terminated without the following process being performed. In other words, the power is turned off or a warning is displayed.

It is preferable that the password and the ciphering program be periodically updated and new ones provided.

An explanation will now be given for a case wherein the above process has been completed, and the IC card 30 is removed from the computer system 10 and is then loaded again. Since the password and the ciphering program have been transmitted from the computer system 10 to the IC card 30, the procedure at step 104 in FIG. 2 for the computer system 10, and the procedure at step 204 in FIG. 3 for the IC card 30 are not required. Instead of the procedure at step 104, the computer system 10 executes a password reference process. More specifically, the computer system 10 instructs the IC card 30 to output information generated for the stored ID, the stored password, and the stored time t. The procedure at step 204 is skipped for the IC card 30. When the IC card 30 is inserted into the computer system 10, the computer system 10 instructs the IC card 30 to output the information. The IC card 30 outputs the generated information to the computer system 10. A password included in the information that is output by the IC card 30 is compared with the registered password. When the passwords match, access to the computer system 10 is permitted.

Since the IC card 30 in this embodiment has the keyboard 50, the keyboard 50 can be used to input a password as necessary. In this case, instead of the procedure at step 204 in FIG. 3, a password input process is performed. The password input at the keyboard 50 of the IC card 30 is stored in the RAM 40. Therefore, when the IC card 30 is inserted into the computer system 10, a request for information output is transmitted from the computer system 10 to the IC card 30. Upon receipt of this request, the IC card 30 performs the password input process, and outputs generated information to the computer system 10. The password included in the information that is output by the IC card 30 is compared with the registered password. When the passwords match, access to the system is permitted.

As is described above, in this embodiment, since the CPU and the RAM for storing the ciphering program are included in the IC card 30, the IC card itself can perform an encoding process. Therefore, an encoded password, which is secret information, can be output. And as the secret information can not be read simply by detecting the output signal from the IC card 30, the security is improved. Further, since the nonvolatile RAM in which the program is temporarily held is employed as a device for storing the ciphering program, the ciphering program can be altered. Even if the program is physically copied by the use of reverse engineering, since the program is only temporary and is not used continuously, enhanced security is provided.

In the above embodiment, as the IC card 30 has the clock 42, the IC card can measure time. Thus, an effective period for a password stored on the IC card 30 can be set. An explanation for the effective period setting process will be given. It should be noted that the time at which a password is registered or is updated is stored together with the password. It should be further noted that the effective period is set by the computer system 10 in advance, or else a predetermined time is set before registration.

Figure 4:
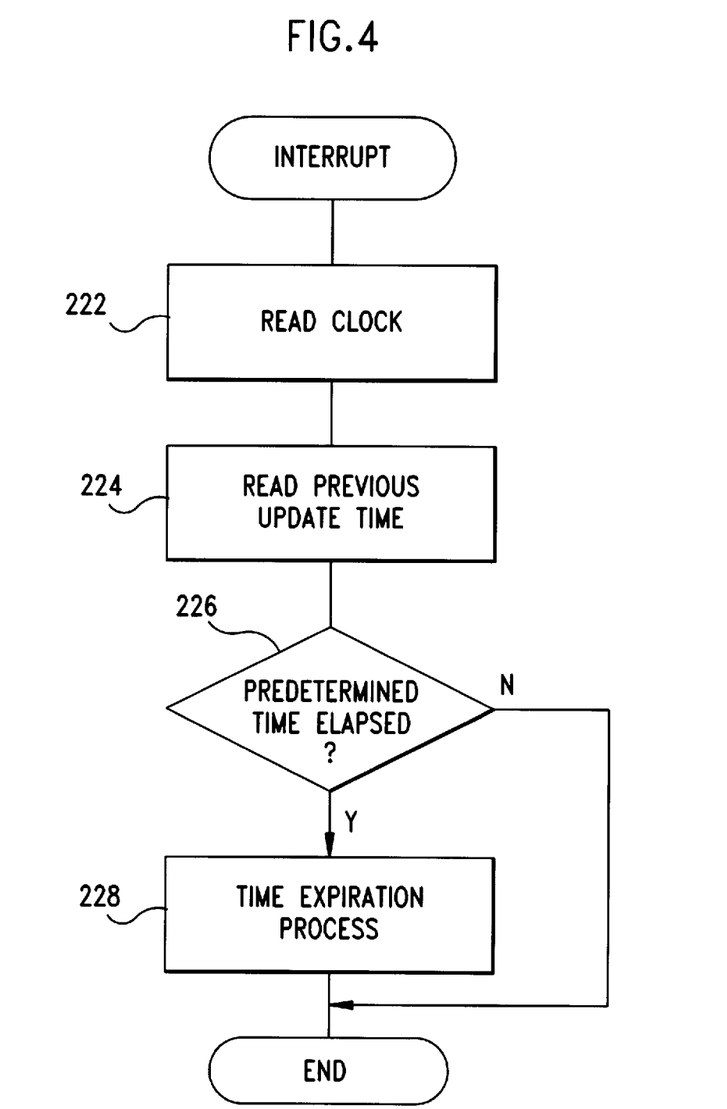
FIG. 4 is a flowchart for a time expiration process.

In FIG. 4 is shown an interrupt routine performed by the IC card 30 each time a predetermined time has elapsed. At step 222 in FIG. 4, the clock 42 is read and a current time is detected. At step 224, the previous update time or the registration time is read. The registration time is stored in the RAM 40 wherein the password is also stored. At step 226, the current time that is read is compared with the update time or the registration time, to determine whether or not the predetermined time has elapsed. When the result is negative, and the predetermined time has not yet elapsed, this routine is terminated. When the result is affirmative, at step 228, a time expiration process is performed. The time expiration process includes an inhibiting process for inhibiting the use of the IC card 30 and a process for notifying the computer system 10 of the time expiration when the IC card 30 is inserted in the computer system 10. If a display device is added to the IC card 30, it is possible to display a warning that a predetermined time has elapsed since the password was registered or updated. In addition, it is also possible for the computer system 10 to display a warning when the IC card 30 is connected to the computer system 10.

Since the IC card 30 has the clock 42 and the nonvolatile RAM 36 for storing the program, the IC card 30 itself can measure time and can also update the password. That is, when a predetermined time has elapsed, a password updating process can be automatically performed for a password stored on the IC card 30. An explanation for the password updating process will be given. It should be noted that the time at which the password was registered or updated is stored with the password. It should also be noted that an effective period is set by the computer system 10 in advance, or that a predetermined time is set as the effective period at the time of registration.

Figure 5:
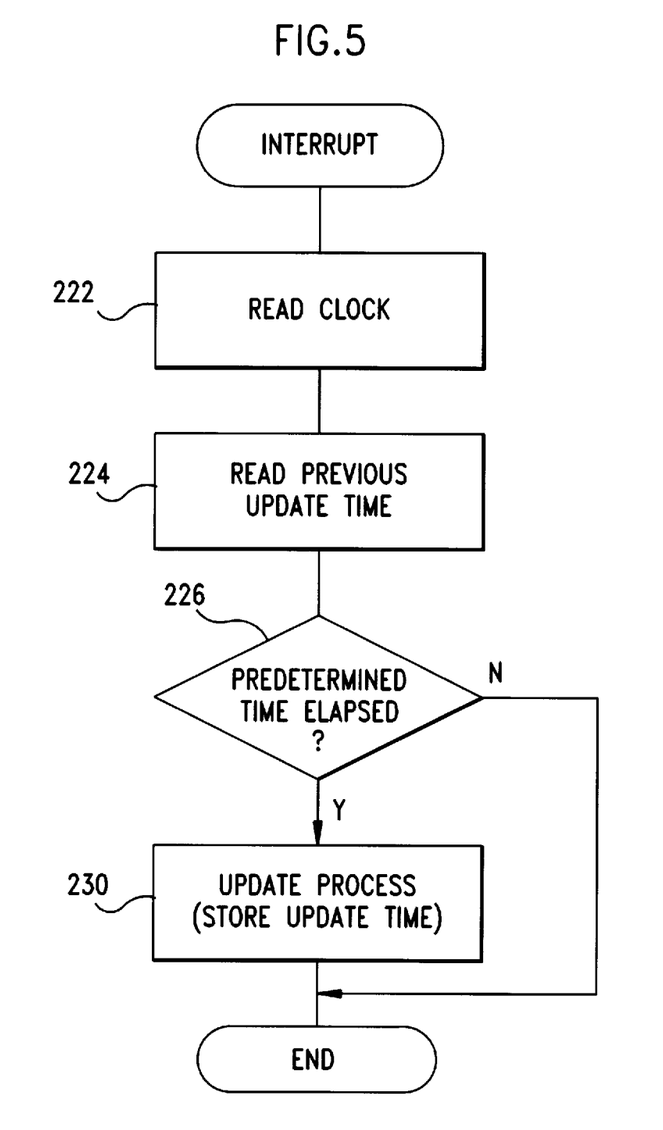
FIG. 5 is a flowchart for an automatic update process.

In FIG. 5 is shown an interrupt routine performed by the IC card 30 each time a predetermined time has elapsed. At step 222 in FIG. 5, the clock 42 is read and a current time is detected, as in the process in FIG. 4. At step 224, the previous update time, or the registration time, is read. At step 226, the current time that was read is compared with the update time or the registration time, to determine whether or not a predetermined time has elapsed. When the result is negative, and the predetermined time has not yet elapsed, this routine is terminated. When the result is affirmative, at step 230, the password update process is performed. During the password update process, an update execution program may be stored in advance on the IC card 30 and the password may automatically be updated. When the IC card 30 is inserted into the computer system 10, an instruction signal may be output so that the computer system 10 starts a process that forces the updating of the password.

Although, in this embodiment, a single user employs an IC card, a plurality of users can also share a single IC card. In this case, since the IC card has the above described nonvolatile RAM, the RAM in which a password is stored is formed like a table to enable it to store a plurality of passwords therein. Then, the security for each password is ensured and a plurality of users can use a single IC card.

Since the IC card in this embodiment includes a nonvolatile RAM, a password updating record and an access disabling record can be stored. When the password updating record and the access disabling record are stored, such records can be read and a user can manage the updating of the password and the accessing of the computer system, i.e., can perform the so-called log management.

As is described above, according to the present invention, secret information from an information processing apparatus and an encoding procedure are stored on an IC card. Secret information that is unique to the IC card, ID information, and a time measured by a clock are encoded in accordance with the stored encoding procedure and the results are output, and the information processing apparatus decodes them. When the decoded secret information matches secret information registered in advance, a mutual connection is authenticated. Therefore, secret information can be exchanged while ensuring that security is maintained.

We claim:

1. An IC card for connection to an information processing apparatus, comprising:

a clock for counting time;

ID storage means for storing a permanent ID;

information storage means for storing a changeable password to identify said IC card when said IC card is connected to said information processing apparatus;

procedure storage means for storing a changeable ciphering program for encrypting said password; and control means for encrypting said password in accordance with said ciphering program stored in said procedure storage means and outputting the encrypted password to a connected information processing apparatus in response to a request for such encrypted password from the connected information processing apparatus.

2. An authentication method, for an information processing apparatus, which employs the IC card defined in claim 1 to authenticate a mutual connection between said IC card and said information processing apparatus, in which said password is registered in advance, comprising the steps of:

transmitting the password and the ciphering program from said information processing apparatus to said IC card;

storing the password and the ciphering program by said IC card;

reading a time count of said clock;

encrypting the time count, the password, and the ID in accordance with the stored ciphering program to produce encrypted information;

transmitting the encrypted information to said information processing apparatus; and deciphering the received encrypted information in accordance with a deciphering program that corresponds to the ciphering program to produce a deciphered password, and authenticating the connection between said IC card and said information processing apparatus only when the deciphered password matches the password registered in advance.

3. The authentication method for an information processing apparatus according to claim 2, wherein the password and the ciphering program are altered in accordance with instructions from said IC card issued at periodic intervals that are based on the time count performed by said clock.

4. The IC card according to claim 1, further comprising a keyboard on the IC card for updating the password.

5. The IC card as in claim 4, further comprising a display mounted on the IC card.

6. The IC card as in claim 1, further comprising a display mounted on the IC card.

* * * * *